(12) United States Patent
Gotoh

(10) Patent No.: US 6,335,676 B1
(45) Date of Patent: Jan. 1, 2002

(54) RADIO SELECTIVE CALL RECEIVER

(75) Inventor: Kazuhumi Gotoh, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/075,726

(22) Filed: May 11, 1998

(30) Foreign Application Priority Data

May 12, 1997 (JP) ............................................. 9-121322

(51) Int. Cl.$^7$ ................................................ H04Q 7/14
(52) U.S. Cl. ................ 340/7.41; 340/7.43; 340/825.21; 370/314; 370/465
(58) Field of Search .......................... 340/825.44, 7.41, 340/7.43, 7.28, 825.2, 825.21; 455/38.2, 228, 307; 370/314, 465, 310, 349; 375/355, 362, 365, 366

(56) References Cited

U.S. PATENT DOCUMENTS

| | | | |
|---|---|---|---|
| 4,642,632 A | * | 2/1987 | Ohyagi ................... 340/825.44 |
| 4,816,820 A | * | 3/1989 | Davis ..................... 340/825.44 |
| 5,168,493 A | * | 12/1992 | Nelson ....................... 370/314 |

FOREIGN PATENT DOCUMENTS

| | | | |
|---|---|---|---|
| JP | 59-52940 | 3/1984 | |
| JP | 1-502870 | 9/1989 | ............ H04B/7/26 |
| JP | 4-371028 | 12/1992 | |
| JP | 8-204761 | 8/1996 | |

OTHER PUBLICATIONS

Abstract of JP 08204761 to Matsumoto, published 1996.*
Abstract of JP 04371028 to Nishiyama, published 1992.*
Japanese Office Action issued Aug. 10, 1999 in a related application.

* cited by examiner

Primary Examiner—Edwin C. Holloway, III
(74) Attorney, Agent, or Firm—Ostrolenk, Faber, Gerb & Soffen, LLP

(57) ABSTRACT

In a selective calling system where a selective calling signal is changeable in transmission rate, a radio selective call receiver includes first and second low-pass filters which are selectively used depending on a transmission rate of the selective calling signal. A data decision section performs data decision of the received signal passing through a selected low-pass filter according to a timing signal which is generated based on a predetermined phase shift amount of the received signal when a transmission rate is changed.

13 Claims, 5 Drawing Sheets

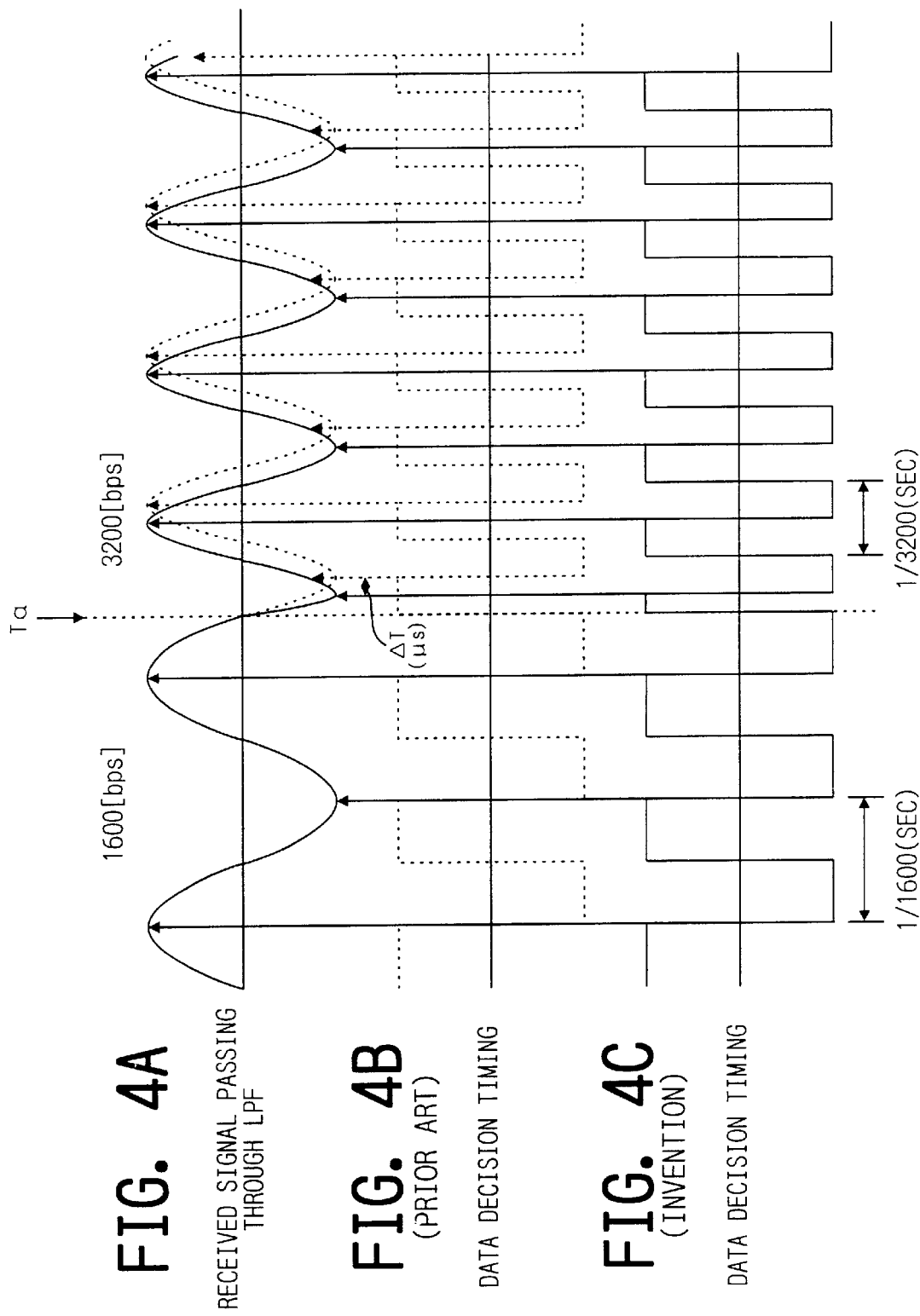

RADIO SELECTIVE CALL RECEIVER

BACKGROUND OF THE INVENTION

1. Field of the Invention

The present invention relates to radio selective call receivers and, more specifically, to a radio selective call receiver and a method for receiving a selective calling signal which changes data transmission rate during receiving.

2. Description of the Related Art

With the widespread use of selective call receivers, occupied channels form an increasing proportion of the total channels of the communications system, resulting in difficulty in ensuring a channel for calling.

To cope with such a problem, there has been proposed a bit-rate changeable receiver in Japanese Patent Laid-open No. 1-502870. The receiver is provided with a controller which controls the cut-off frequency of a low-pass filter depending on the bit rate of a received signal. More specifically, the low-pass filter is controlled such that the frequency components higher than the bit-rate frequency are cut off to eliminate noise components.

SUMMARY OF THE INVENTION

However, the inventor has found that changing the cut-off frequency of the low-pass filter produces a phase shift in the received signal passing through the low-pass filter. For example, in the case where the bit rate switches from 1600 bps (bits per second) to 3200 bps, the cut-off frequency of the low-pass filter also switches from 1600 bps to 3200 bps. In this case, the received signal shifts in phase by a predetermined time period T as shown in FIG. 4A. If such a phase shift is ignored, the data decision fails to be performed each time the received signal reaches a crest and a trough, resulting in faulty receiving.

An object of the present invention is to provide a selective call receiver and a receiving method which can achieve the reliable data decision even when the transmission rate is changed during receiving.

According to the invention, a radio selective call receiver for receiving a selective calling signal which is changeable in transmission rate is comprised of a filter for filtering out a selected frequency range of components of the selective calling signal to produce a received signal, wherein the selected frequency range is determined depending on a transmission rate of the selective calling signal. The radio selective call receiver further includes a data decision section performing data decision of the received signal according to a timing signal, and a timing generator for generating the timing signal from a reference timing signal based on a predetermined change of the received signal when a first transmission rate is changed to a second transmission rate.

Since the timing signal is generated based on the predetermined change of the received signal when a first transmission rate is changed to a second transmission rate, the data decision section can perform the data decision of the received signal according the timing signal synchronizing to the received signal, resulting in reliable receiving operation even in the case of the transmission rate being changed.

BRIEF DESCRIPTION OF THE DRAWINGS

FIG. 4A is a diagram showing a wave form of a received signal passing through a low-pass filter when a bit-rate change occurs;

FIG. 4B is a timing chart showing conventional data decision timing; and

FIG. 4C is a timing chart showing data decision timing according to the embodiment.

DESCRIPTION OF THE PREFERRED EMBODIMENT

Figure 1:
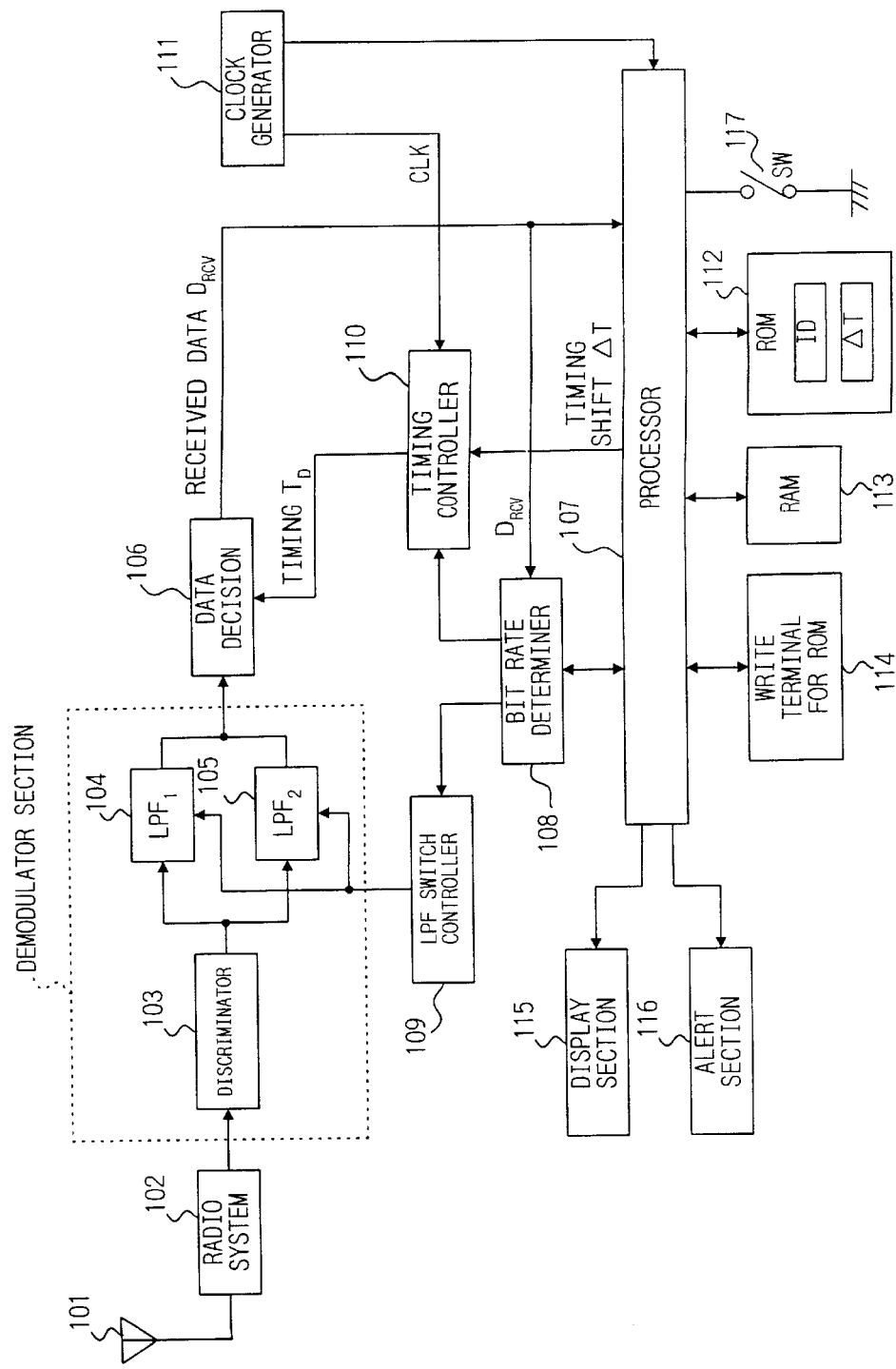
FIG. 1 is a block diagram showing an embodiment of a radio selective call receiver according to the present invention.

Referring to FIG. 1, an antenna 101 is connected to a radio system 102 which receives a radio signal from a radio base station (not shown) of a selective calling system through the antenna 101. The radio system 102 includes a frequency converter which converts the received radio signal from a radio frequency (RF) to intermediate frequency (IF). The received IF signal is transferred to a demodulator section which demodulates it into a baseband signal.

The demodulator section is comprised of a discriminator 103 and a plurality of low-pass filters (LPF) 104 and 105. The discriminator 103 performs frequency-voltage conversion of the received IF signal to produce a baseband signal. The baseband signal passes through a selected one of the low-pass filters 104 and 105. In this embodiment, the low-pass filter 104 is designed for an initial bit rate (here, 1600 bps) and the low-pass filter 105 is for a higher bit rate (here, 3200 bps).

The baseband signal passing through the selected low-pass filter is output to a data decision section 106 which performs data decision of the baseband signal according to a timing signal $T_D$ to produce received data $D_{RCV}$. The received data $D_{RCV}$ is output to a processor 107 and a bit-rate determiner 108.

The bit-rate determiner 108 determines the bit rate of the received data $D_{RCV}$ and outputs the determination signal to an LPF switch controller 109 and a timing controller 110. The LPF switch controller 109 selects one of the low-pass filters 104 and 105 depending on the determination signal received from the bit-rate determiner 108. The timing controller 110 is provided with a register for storing a timing shift $\Delta T$ received from the processor 107 and generates the timing signal $T_D$ from a clock signal CLK received from a clock generator 111 depending on the determination signal. More specifically, the timing signal $T_D$ is shifted by the timing shift $\Delta T$ when the bit rate is changed from 1600 bps to 3200 bps. The frequency of the clock signal CLK may be 153.6 kHz. The clock generator 111 also supplies the clock signal to the processor 107.

The processor 107 is connected to a read-only memory (ROM) 112, a random access memory (RAM) 113 and a write terminal 114 for the ROM 112. The ROM 112 may be an electrically-erasable programmable ROM (EEPROM) and stores group information indicating the group to be received, an identification (ID) number of the receiver itself and the timing shift $\Delta T$. The RAM 113 is used to store received message data and other necessary information. The write terminal 114 is used to write the timing shift data $\Delta T$ onto the ROM 112. The processor 107 controls a display section 115 including liquid-crystal display (LCD) and an alert section 116 including a beeper, a vibrator and/or a light-emitting diode.

Further, the processor 107 controls the radio system and the demodulator section according to the well-known intermittent control sequence. A receiving operation is started when a power-supply switch 117 is closed.

Figure 2:
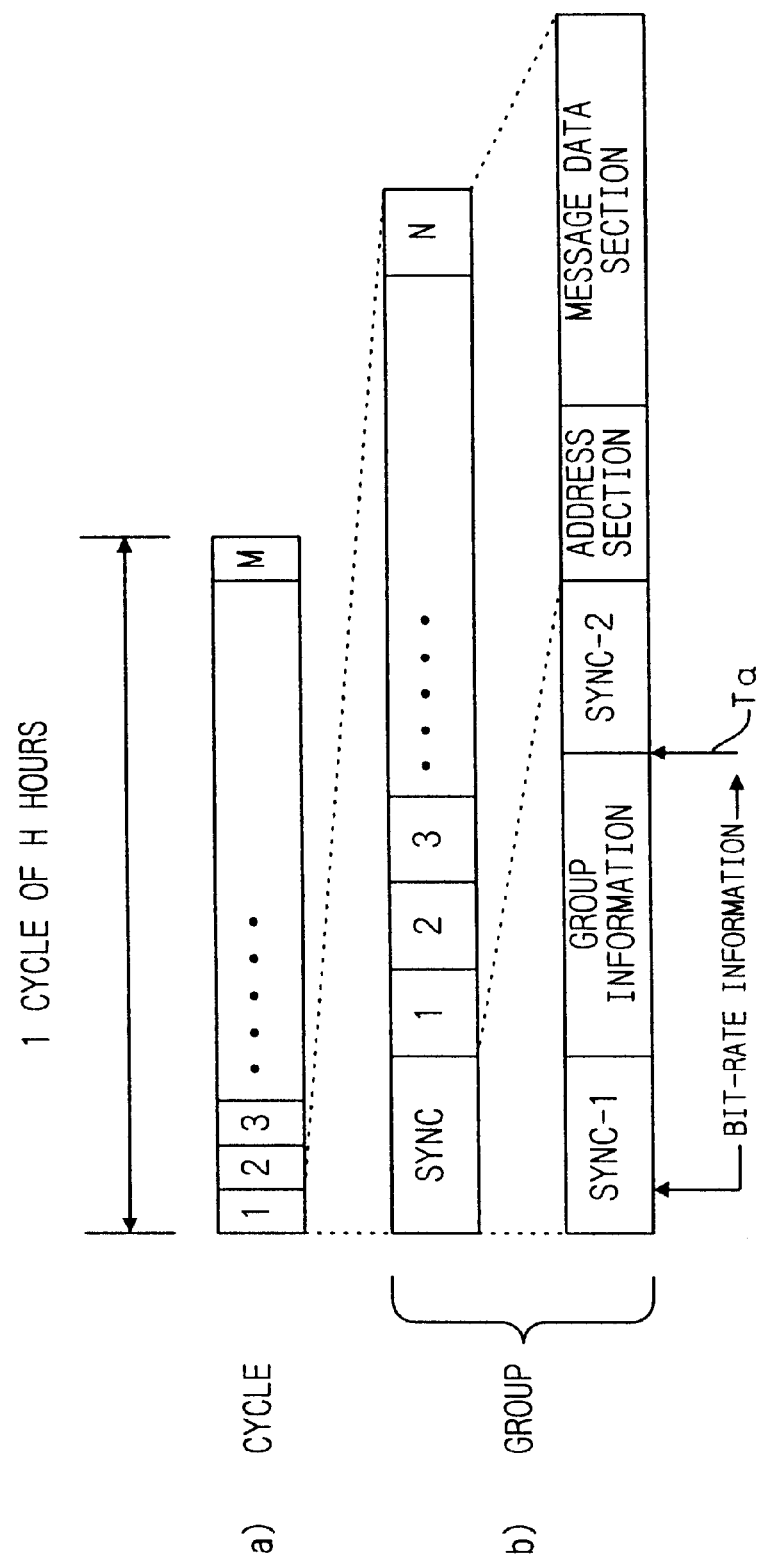
FIG. 2 is a diagram showing a signal format of a selective calling signal.

Referring to FIG. 2, a radio base station of the system transmits a synchronized selective calling signal having the following format. A cycle of H hours consists of M groups each consisting of a synchronization section SYNC and N blocks. The synchronization section SYNC consists of a first sync section SYNC-1, a group information section and a second sync section SYNC-2. The N blocks include an address section and a message data section.

The first sync section SYNC-1 corresponds to an initial bit rate and includes bit-rate change information by which the received bit rate is changed after the timing $T_\alpha$ of the second sync section SYNC-2.

As described before, the timing shift data $\Delta T$ can be stored onto the ROM 112 from outside. The timing shift amount $\Delta T$ may be previously obtained by switching between different bit rates and between low-pass filters corresponding to the bit rates, respectively.

Figure 3A:
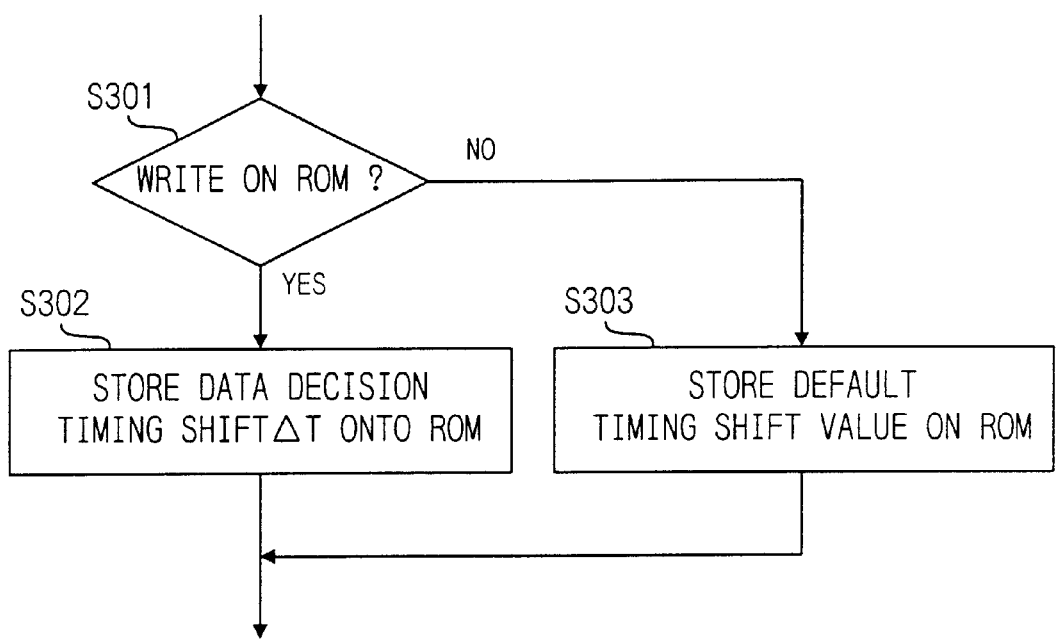
FIG. 3A is a flow chart showing a ROM setting routine for storing data decision timing shift data onto ROM.

Referring to FIG. 3A, the processor 107 determines whether a ROM-write request is received (step S301). If the ROM write request is received (YES in step S301), the processor receives the timing shift data $\Delta T$ from the write terminal 114 and stores it onto the ROM 112. At this time, the group information and the ID number may be store onto the ROM 112. If the ROM write request is not received (NO in step S301), the processor 107 maintains the status quo or stores a default value as the timing shift data $\Delta T$ onto the ROM 112 (step S303).

It should be noted that the steps S301–S303 are performed only when an engineering change or new designing of the demodulator section is made. The receiving operation of the receiver will be described hereinafter.

Figure 3B:
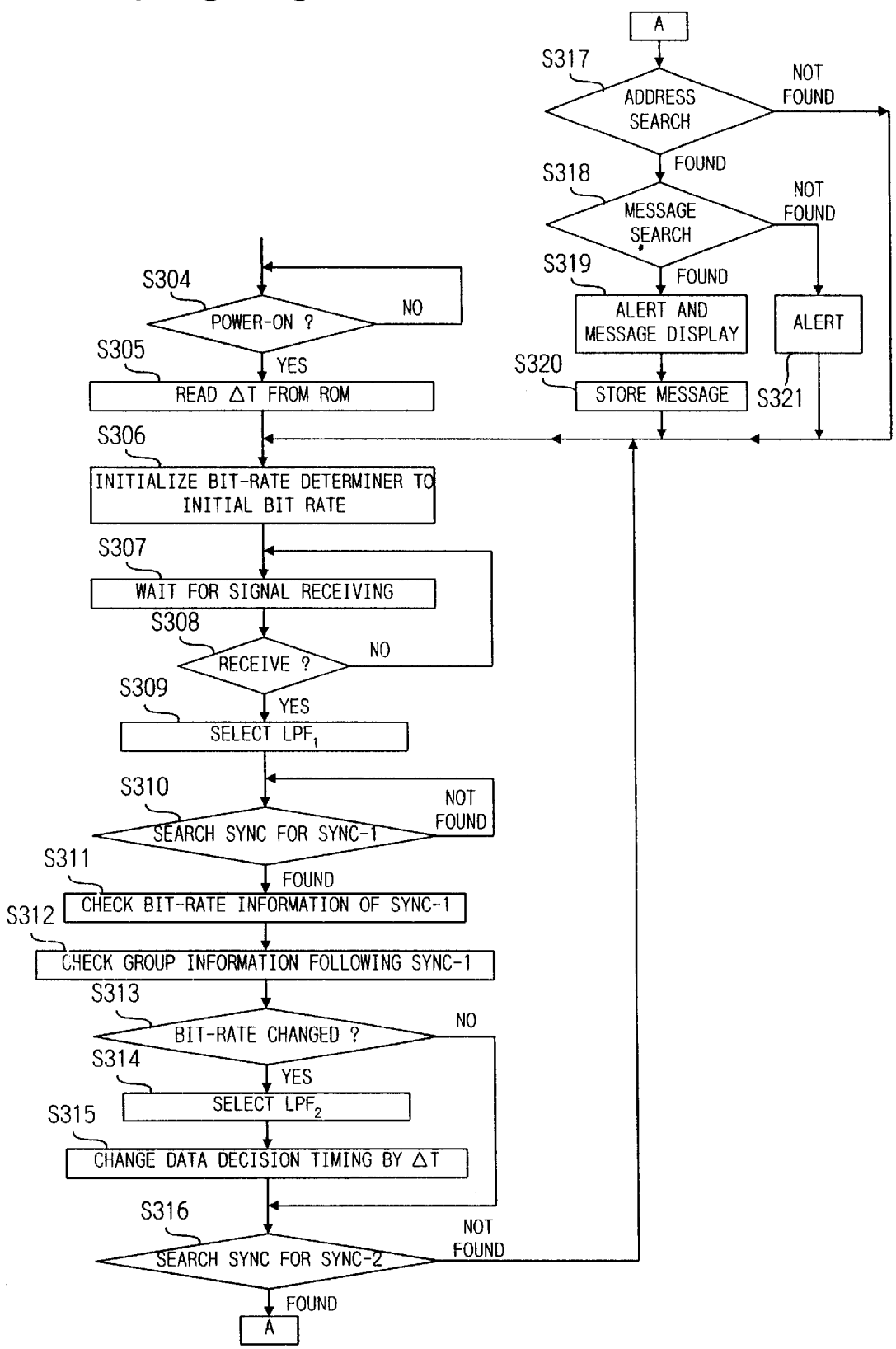
FIG. 3B is a flow chart showing a receiving operation of the radio selective call receiver.

Referring to FIG. 3B, when the power-supply switch 117 is closed (YES in step S304), the processor 107 reads the timing shift data $\Delta T$ from the ROM 112 and stores it onto the timing controller 110 (step S305). Since the timing shift data $\Delta T$ is stored onto the register of the timing controller 110 in advance, the timing controller 110 can quickly change the timing of the data decision timing signal $T_D$ using the timing shift data $\Delta T$ without delay.

Subsequently, the processor 107 initializes the bit-rate determiner 108 to an initial bit rate (step S306) and then waits for signal receiving (steps S307 and S308).

When receiving a selective calling signal (YES in step S308), the bit rate determiner 108 outputs the initial bit rate information to the LPF switch controller 109. When receiving the initial bit rate information, the LPF switch controller 109 selects the low-pass filter (LPF,) 104 for the initial bit rate (step S309).

Further, the bit rate determiner 108 outputs the initial bit rate information to the timing controller 110. When receiving the initial bit rate information, the timing controller 110 generates the timing signal $T_D$ for the initial bit rate from the clock signal CLK. The data decision section 106 performs data decision of the received baseband signal output from the low-pass filter (LPF$_1$) 104 according to the timing signal $T_D$ for the initial bit rate.

The processor 107 searches the sync section SYNC for the first sync section SYNC-1 in the received data $D_{RCV}$ while the radio system 102 is continuously receiving the selective calling signal (step S310). If the first sync section SYNC-1 is not found in the received data $D_{RCV}$ (NO in step S310), the searching for the first sync section SYNC-1 is intermittently performed at regular intervals.

If the first sync section SYNC-1 is found in the received data $D_{RCV}$ (YES in step S310), the bit rate determiner 108 checks the bit-rate information of the first sync section SYNC-1 (step S311). Further, the processor 107 checks the present group information and determines the receive timing (step S312).

When the bit rate determiner 108 determines that the bit-rate information of the first sync section SYNC-1 indi-cates a bit-rate change (YES in step S313), the bit rate determiner 108 outputs the bit-rate change determination signal to the LPF switch controller 109. When receiving the bit-rate change determination signal, the LPF switch controller 109 switches the low-pass filter (LPF$_1$) 104 to another low-pass filter, that is, the low-pass filter (LPF$_2$) 105 for the higher bit rate (step S314). The bit rate determiner 108 also outputs the bit-rate change determination signal to the timing controller 110. When receiving the bit-rate change determination signal, the timing controller 110 generates the timing signal $T_D$ for the higher bit rate by using the timing shift data $\Delta T$ which has been stored in the register thereof (step S315). More specifically, the timing controller 110 shifts the phase of a timing signal generated from the clock signal CLK by the timing shift data $\Delta T$ such that the data decision section 106 performs data decision each time the received signal reaches a crest and a trough.

When the data decision timing has been changed (step 315), the processor 107 searches the sync section SYNC for the second sync section SYNC-2 in the received data $D_{RCV}$ with the timing signal $T_D$ for the higher bit rate (step S316). On the other hand, when the bit rate determiner 108 determines that the bit-rate information of the first sync section SYNC-1 indicates no bit-rate change (NO in step S313), the processor 107 also searches the sync section SYNC for the second sync section SYNC-2 in the received data $D_{RCV}$ but with the timing signal $T_D$ for the initial bit rate (step S316).

If the second sync section SYNC-2 is not found in the received data $D_{RCV}$ (step S316), control goes back to the step S306 where the bit-rate determiner 108 is initialized to the initial bit rate.

If the second sync section SYNC-2 is found in the received data $D_{RCV}$, the processor 107 searches the address section for the self address by comparing addresses included in the address section one by one with the ID number stored in the ROM 112 (step S317). When the ID number is not found in the address section, control goes back to the step S306. When the ID number is found in the address section, the processor 107 checks whether the message section includes the message located at a position corresponding to the self address (step S318). When the message addressed to the receiver itself is found (step S318), the processor 107 controls the display section 115 and the alert section 116 so that a user is informed by sound, light-blinking and/or vibration of call incoming and the received message is displayed on the display section 115 (step S319). The processor 107 further transfers the received message to the RAM 113 so that the user can confirm the message later (step S320). Thereafter, control goes back to the step S306. When the message addressed to the receiver itself is not found (step S318), the processor 107 controls only the alert section 116 so that the user is informed by sound, light-blinking and/or vibration of call incoming (step S321). Thereafter, control goes back to the step S306.

The details will be described hereinafter in the case where the bit rate is changed from the initial bit rate of 1600 bps to the higher bit rate of 3200 bps. Further, it is assumed that the timing shift $\Delta T$ generated when the bit rate is changed is previously stored onto the ROM 112.

As shown in FIG. 4A, while inputting the received signal from the low-pass filter 104 for the initial bit rate, the data decision section 106 operates according to the timing signal $T_D$ of 1600 Hz so that the falling edges of the timing signal $T_D$ synchronize to the crests and troughs of the received signal as shown in FIGS. 4B and 4C.

At the timing instant $T_\alpha$ when the bit rate of the received signal is changed from 1600 bps to 3200 bps and the low-pass filter 104 is switched to the low-pass filter 105, however, the crests and troughs of the received signal of 3200 bps (indicated by a solid line) are shifted by the timing shift data $\Delta T$ as shown in FIG. 4A.

Therefore, if the timing signal $T_D$ of 1600 Hz is switched to that of 3200 Hz with synchronizing to each other as shown in FIG. 4B, the data decision fails to be performed at each timing instant when the received signal of 3200 bps reaches a crest and a trough.

Contrarily, according to the present invention, the timing signal $T_D$ is shifted by the timing shift $\Delta T$ at the timing instant $T_\alpha$ as shown in FIG. 4C. Therefore, the data decision section 106 also operates according to the timing signal $T_D$ of 3200 Hz so that the falling edges of the timing signal $T_D$ synchronize to the crests and troughs of the received signal as shown in FIGS. 4A and 4C. This results in successful receiving even when the transmission bit rate is changed during receiving.

As described above, since the timing shift $\Delta T$ is produced from phase shift information due to low-pass filter change and is used to synchronize to the crests and troughs of the received signal passing through the low-pass filter, the reliability of data receiving is improved in high-speed data transmission.

What is claimed is:

1. A radio selective call receiver for receiving a selective calling signal which is changeable in transmission rate, comprising:

a filter for filtering out a selected frequency range of components of the selective calling signal to produce a received signal, wherein the selected frequency range is determined depending on a transmission rate of the selective calling signal;

a data decision section performing data decision of the received signal according to a timing signal; and a timing generator for generating the timing signal from a reference timing signal based on a predetermined change of the received signal when a first transmission rate is changed to a second transmission rate, wherein the timing generator generates the timing signal such that a phase of the timing signal is shifted by a predetermined phase shift amount when the first transmission rate is changed to the second transmission rate, and wherein the predetermined phase shift amount is previously obtained based on the received signal.

2. The radio selective call receiver according to claim 1, wherein the predetermined phase shift amount is determined so that the timing signal synchronizes to crests and troughs of the received signal at the second transmission rate.

3. The radio selective call receiver according to claim 1, further comprising:

a memory for storing the predetermined phase shift amount; and a write controller for writing the predetermined phase shift amount onto the memory through an external terminal provided in the radio selective call receiver.

4. The radio selective call receiver according to claim 3, wherein the timing generator comprises a register for storing the predetermined phase shift amount which was transferred from the memory when powered on.

5. A radio selective call receiver for receiving a selective calling signal which is changeable in transmission rate, comprising:

at least two filters each for blocking a different frequency range of components of the selective calling signal to produce a received signal;

a data decision section performing data decision of the received signal according to a timing signal;

a timing generator for generating the timing signal varying in frequency and phase depending on a predetermined change of the received signal when a first transmission rate is changed to a second transmission rate;

a transmission rate determiner for determining a current transmission rate based on the received signal; and a controller for selecting one of the filters for processing the selective calling signal depending on the current transmission rate of the selective calling signal.

6. The radio selective call receiver according to claim 5, wherein the controller selects a predetermined filter corresponding to a predetermined initial transmission rate when starting receiving the selective calling signal.

7. The radio selective call receiver according to claim 6, wherein the controller switches the predetermined filter to another filter corresponding to a transmission rate higher than the predetermined initial transmission rate.

8. The radio selective call receiver according to claim 5, wherein the timing generator generates the timing signal such that a phase of the timing signal is shifted by a predetermined phase shift amount when the first transmission rate is changed to the second transmission rate, wherein the predetermined phase shift amount is previously obtained based on the received signal when the first transmission rate is changed to the second transmission rate.

9. The radio selective call receiver according to claim 8, wherein the predetermined phase shift amount is determined so that the timing signal synchronizes to crests and troughs of the received signal at the second transmission rate.

10. A method for receiving a selective calling signal which is changeable in transmission rate in a radio selective call receiver, comprising the steps of:

filtering out a selected frequency range of components of the selective calling signal to produce a received signal, wherein the selected frequency range is determined depending on a transmission rate of the selective calling signal;

performing data decision of the received signal according to a timing signal; and generating the timing signal from a reference timing signal based on a predetermined change of the received signal when a first transmission rate is changed to a second transmission rate, wherein the timing signal is generated such that a phase of the timing signal is shifted by a predetermined phase shift amount when the first transmission rate is changed to the second transmission rate, and wherein the predetermined phase shift amount is previously obtained based on the received signal.

11. The method according to claim 10, wherein the predetermined phase shift amount is determined so that the timing signal synchronizes to crests and troughs of the received signal at the second transmission rate.

12. The method according to claim 10, further comprising the steps of:

writing the predetermined phase shift amount onto a memory through an external terminal provided in the radio selective call receiver.

13. The method according to claim 12, wherein the predetermined phase shift amount is transferred from the memory to a register so as to be quickly used to generate the timing signal.

* * * * *